US007283378B2

(12) United States Patent
Clemmons

(10) Patent No.: US 7,283,378 B2
(45) Date of Patent: Oct. 16, 2007

(54) HIGH EFFICIENCY DC LINK INDUCTOR

(75) Inventor: James H. Clemmons, Freeport, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 481 days.

(21) Appl. No.: 10/920,001

(22) Filed: Aug. 17, 2004

(65) Prior Publication Data

US 2006/0055568 A1 Mar. 16, 2006

(51) Int. Cl.
*H02M 5/42* (2006.01)

(52) U.S. Cl. .......................................... 363/90; 363/93

(58) Field of Classification Search ................ 375/259, 375/239, 268, 269; 363/13, 17, 90, 91, 93, 363/94, 100, 101, 104
See application file for complete search history.

(56) References Cited

U.S. PATENT DOCUMENTS

| | | | | |
|---|---|---|---|---|
| 6,442,210 | B1 * | 8/2002 | Pennell | 375/259 |
| 6,442,434 | B1 * | 8/2002 | Zarinetchi et al. | 607/61 |
| 6,583,994 | B2 * | 6/2003 | Clayton et al. | 363/21.18 |
| 2005/0024896 | A1 * | 2/2005 | Man-Ho | 363/21.04 |

* cited by examiner

*Primary Examiner*—Shih-Chao Chen
*Assistant Examiner*—Dieu A Minh
(74) *Attorney, Agent, or Firm*—Stephen G. Mican

(57) ABSTRACT

An improved inductor for a DC link that has an auxiliary winding for inducing an opposing magnetic field in a magnetically permeable core with an auxiliary DC current that opposes a magnetic field that a primary winding for the inductor induces along a magnetic path in the core with a DC component of current to reduce magnetic saturation of the inductor due to the DC component.

9 Claims, 1 Drawing Sheet

HIGH EFFICIENCY DC LINK INDUCTOR

FIELD OF THE INVENTION

The invention relates to alternating current (AC) to direct current (DC) power conversion, and more particularly to DC link inductors that are used as part of an AC filter in a DC link.

BACKGROUND OF THE INVENTION

When an inductor is used as part of an AC filter in a DC link, the total DC current flows through the inductor. As a result of the current flow, the energy stored in the inductor is ½ $LI^2$, where L is the inductance of the inductor and I is the current. A load connected uses some of this energy and the remainder is stored in the inductor. Because of this, the inductor has to be sized to store the energy consumed by the load plus the stored energy.

Significant DC current in an inductor leads to magnetic saturation of its magnetically permeable core. Generally, an air gap has to be inserted somewhere in the magnetic path of the core in order to avoid such DC induced magnetic saturation. The air gap has the effect of increasing the length of the magnetic path. As the magnetic path length is increased, the magnetic, or H, field decreases. This places the magnetic operating point of the inductor in the linear region of its hysteresis, or B-H, loop where the permeability of the core is relatively large.

Even though the core permeability is large, the air gap causes the effective permeability to be less than the core permeability. Since the inductance is proportional to the effective permeability and inversely proportional to the magnetic path length, the insertion of the air gap decreases the inductance of the inductor. Since the air gap is necessary to avoid magnetic saturation, the number of turns of the inductor has to be increased, the area of the core has to be increased, or both in order to make up for the inductance loss caused by insertion of the air gap. It is usually preferable to increase the core area, since the addition of turns also increases the H field, and that may require an increase in the air gap. In any case, the presence of DC current in an inductor requires that the inductor be sized larger than if no DC current were present.

Another way to reduce the increased H field due to DC inductor current is to insert another H field through the magnetic path of the inductor that has an opposite orientation. The net H field is thus reduced and the magnetic operating point of the inductor may be maintained in the linear region of the hysteresis loop without a lengthy air gap. In this way, the air gap may be shortened or eliminated and the effective permeability of the inductor shall be greater. Since the effective permeability is larger, the inductor core size may be reduced compared to a similar inductor without the inserted H field of reverse orientation.

In the past, such an oppositely oriented H field has been introduced with a permanent magnet so positioned relative to the inductor to oppose the inductor DC current induced H field. This method can work satisfactorily, but it has two serious drawbacks. When the permanent magnet is made, the H field of the magnet has to be controlled to a prescribed level that satisfactorily cancels the inductor DC current induced H field when mounted proximate the inductor. Another drawback is that the H field of the permanent magnet is static, and therefore cannot be controlled after the permanent magnet is mounted proximate the inductor. Thus, if the inductor DC current is variable, the H field due to the permanent magnet may dominate when the inductor DC current is low and the H field due to the inductor DC current may dominate when the inductor DC current is very high. The third drawback is that a permanent magnet has a low permeability and therefore it introduces an equivalent air gap into the magnetic path of the inductor.

SUMMARY OF THE INVENTION

The invention includes an improved inductor with an auxiliary winding such that the application of a DC current to the auxiliary winding induces an H field in the magnetic path of the inductor that opposes and cancels the inductor DC current induced H field. The net H field is thus reduced and the magnetic operating point of the inductor may be maintained in the linear region of the hysteresis loop without a lengthy air gap. Furthermore, the DC current in the auxiliary winding may be controlled to change the opposing H field intensity to track changes in the inductor DC current induced H field, such as with a feed back loop.

In a preferred embodiment, the invention comprises an improved inductor suitable as part of a DC link for converting AC to DC, comprising: a magnetically permeable core; a primary winding for inducing a magnetic field in the core through a magnetic path with an inductor current that includes a DC component; and an auxiliary winding for inducing an opposing magnetic field in the core through the magnetic path that opposes the magnetic field to reduce magnetic saturation of the core due to the magnetic field that is generated by the DC component.

DETAILED DESCRIPTION OF THE INVENTION

Figure 1:
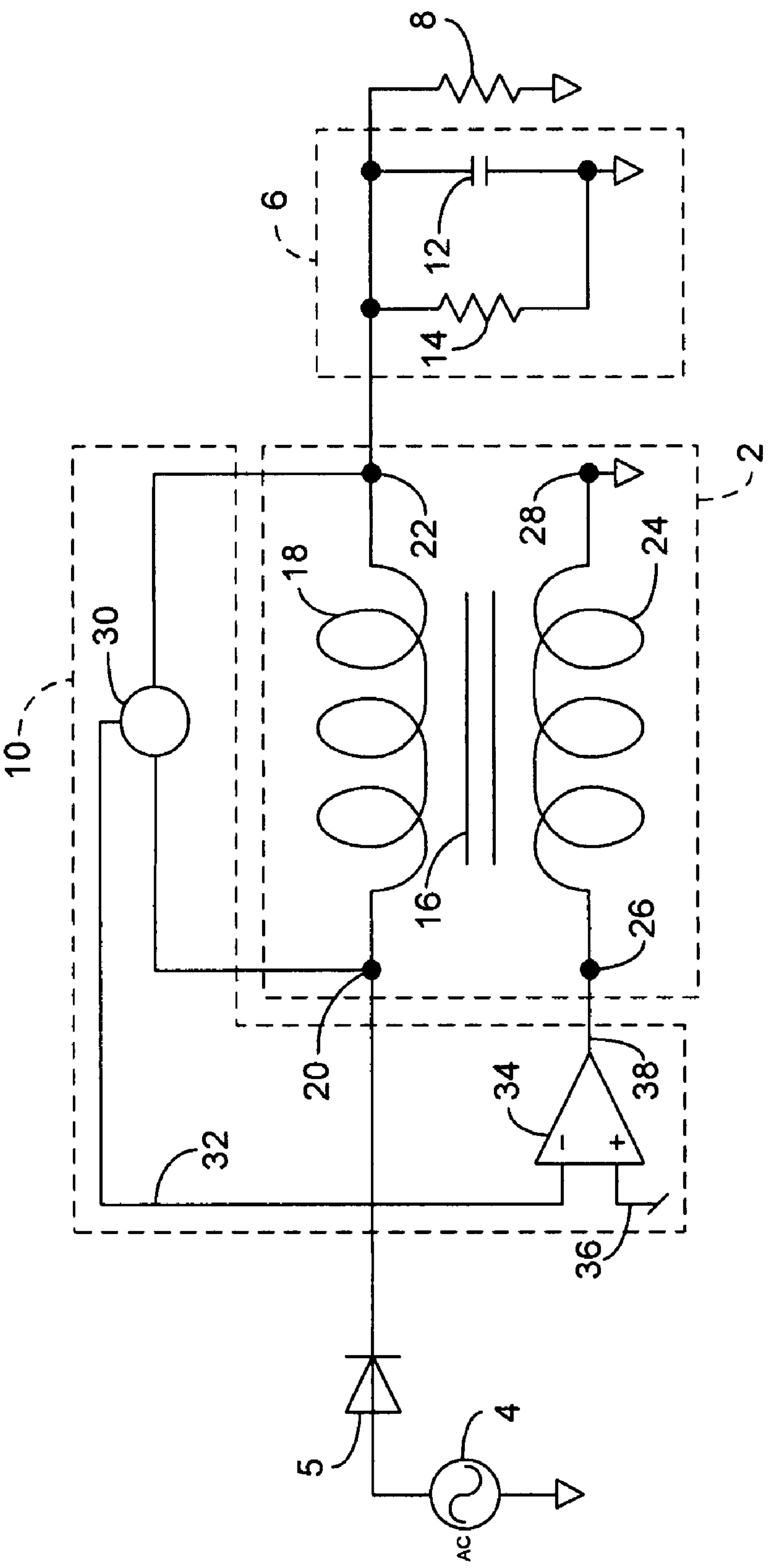
FIG. 1 is a schematic diagram that contains an improved DC link inductor according to a preferred embodiment of the invention that shows an associated power source, DC filter section, load and feed back loop section.

FIG. 1 is a schematic diagram that contains an improved DC link inductor 2 according to a preferred embodiment of the invention that shows an associated power source 4, a rectifier 5, DC filter section 6, load 8 and feed back loop section 10. The rectifier 5 is typically a rectifier section of an AC to DC power supply that produces a DC component and an unfiltered AC ripple component. As shown in FIG. 1, the filter section 6 comprises the inductor 2 in combination with a capacitor 12 and a bleed resistance 14 to form a well-known single section inductive input filter. The capacitor 12 filters the ripple potential and in so doing enhances the ripple current. The inductor then filters out the ripple current. Since the ripple current is filtered out, the current supplied by the AC power source 4 is not distorted. Of course, capacitor 14 could precede the inductor 2 to form a capacitive input filter, and the filter section 6 may comprise a multi-stage inductive or capacitive input filter, as shall be appreciated by those skilled in the art.

The inductor 2 has a magnetically permeable core 16 and a primary winding 18 wound on the core 16 with an input terminal 20 and an output terminal 22. The primary winding 18 has an inductance that is suitable for use in the filter section 6. As explained above, current from the rectifier 5 has an AC component and a DC component that feeds the input terminal 20 of the primary winding 18. The DC current passes through the output terminal 22 of the inductor 2 and into the bleed resistance 14 and the load 8. The DC current that flows through the primary winding 18 induces an H field in a magnetic path in the core 16. The high reactance of the inductor 2 to the AC potential component effectively blocks most of the AC potential component from passing through the inductance 2 to the bleed resistance 14 and load 8. Any small portion of the AC potential component that passes through the inductor 2 is filtered by the low reactance of the capacitor 12 to the AC component.

In addition, the inductor 2 has an auxiliary winding 24 wound on the core 16 with an input terminal 26 and an output terminal 28. The winding 24 is wound on the core 16 such that the application of auxiliary winding DC current from the input terminal 26 to the output terminal 28 results in an H field that travels through the magnetic path in the core 16 in opposition to the DC component induced H field.

The intensity of the auxiliary winding DC current is preferably adjusted to a level that induces an opposing H field that cancels the H field induced by the inductor DC component. In this way, the inductor 2 minimises residual stored energy and this allows the size of the inductor 2 to be reduced. The auxiliary winding DC current may be manually adjusted, which may be satisfactory if load current is relatively constant, or it may be automatically adjusted, such as with the feedback section 10.

The feedback section 10 shown in FIG. 1 comprises an AC potential detector 30 that measures the AC potential difference between the input terminal 20 and the output terminal 22 of the primary winding 18. The AC potential detector 30 provides an output signal on a line 32 that is representative of the magnitude of this AC potential difference. The output signal on the line 32 is fed to one input of an amplifier 34. A potential reference bias signal on a line 36 is fed to the other input of the amplifier 34. The output of the amplifier 34 on a line 38 provides the auxiliary winding DC current to the input terminal 26 of the auxiliary winding 24.

The auxiliary winding DC current is proportional to the potential of the reference signal minus the potential of the output signal provided by the AC potential difference detector 30. As the AC potential difference across between the input terminal 20 and the output terminal 22 of the primary winding 18 decreases, such as due to increased stored energy in the inductor 2, the auxiliary winding DC current provided by the amplifier 34 increases to lower the resultant H field and increase the AC potential difference. The potential of the reference signal may be adjusted so that the operating point of the inductor 2 remains in a linear portion of its hysteresis loop.

Described above is an improved inductor for a DC link that has an auxiliary winding for inducing an opposing magnetic field in a magnetically permeable core with an auxiliary DC current that opposes a magnetic field that a primary winding for the inductor induces along a magnetic path in the core with a DC component of current to reduce magnetic saturation of the inductor due to the DC component. It should be understood that this embodiment is only an illustrative implementation of the invention, that the various parts and arrangement thereof may be changed or substituted, and that the invention is only limited by the scope of the attached claims.

What is claimed is:

1. An power supply inductor suitable as part of a direct current (DC) link in a DC power supply for converting alternating current (AC) to DC, comprising:

a magnetically permeable core;

a primary winding wound on the core for inducing a magnetic field in the core through a magnetic path with an inductor current that includes a DC component; and an auxiliary winding wound on the core for inducing an opposing magnetic field in the core through the magnetic path with an auxiliary DC winding current that opposes the magnetic field to reduce magnetic saturation of the core due to the magnetic field that is generated by the DC component.

2. The inductor of claim 1, further comprising a feed back loop for automatically adjusting the level of auxiliary winding current to operate the inductor in a linear region of its hysteresis loop.

3. The inductor of claim 2, wherein the feed back loop comprises:

an AC sensor for sensing AC potential difference developed across the primary winding to generate an output signal representative of this AC potential difference; and an amplifier that has one input connected to the output signal to generate the auxiliary winding current with a magnitude that is inversely proportional to the output signal.

4. The inductor of claim 3, wherein the other input of the amplifier is connected to a reference potential bias signal for controlling the operating point of the inductor to be in a linear region of its hysteresis loop.

5. An power supply inductor suitable as part of a direct current (DC) link in a DC cower supply for converting alternating current (AC) to DC, comprising:

a magnetically permeable core;

a primary winding wound on the core for inducing a magnetic field in the core through a magnetic path with an inductor current that includes a DC component;

an auxiliary winding wound on the core for inducing an opposing magnetic field in the core through the magnetic path with an auxiliary DC winding current that opposes the magnetic field to reduce magnetic saturation of the core due to the magnetic field that is generated by the DC component; and a feed back loop for automatically adjusting the level of auxiliary winding current to operate the inductor in a linear region of its hysteresis loop.

6. The inductor of claim 5, wherein the feed back loop comprises:

an AC sensor for sensing AC potential difference developed across the primary winding to generate an output signal representative of this AC potential difference; and an amplifier that has one input connected to the output signal to generate the auxiliary winding current with a magnitude that is inversely proportional to the output signal.

7. The inductor of claim 6, wherein the other input of the amplifier is connected to a reference potential bias signal for controlling the operating point of the inductor to be in a linear region of its hysteresis loop.

8. An power supply inductor suitable as part of a direct current (DC) link in a DC power supply for converting alternating current (AC) to DC, comprising:

a magnetically permeable core;

a primary winding wound on the core for inducing a magnetic field in the core through a magnetic path with an inductor current that includes a DC component;

an auxiliary winding wound on the core for inducing an opposing magnetic field in the core through the magnetic path with an auxiliary DC winding current that opposes the magnetic field to reduce magnetic saturation of the core due to the magnetic field that is generated by the DC component; and a feed back loop comprising an AC sensor for sensing AC potential difference developed across the primary winding to generate an output signal representative of this AC potential difference and a amplifier that has one input connected to the output signal to generate the auxiliary winding current with a magnitude that is inversely proportional to the output signal for automatically adjusting the level of auxiliary winding current to operate the inductor in a linear region of its hysteresis loop.

9. The inductor of claim 8, wherein the other input of the amplifier connected to a reference potential bias signal for controlling the operating point of the inductor to be in a linear region of its hysteresis loop.

* * * * *